Patented Nov. 4, 1930

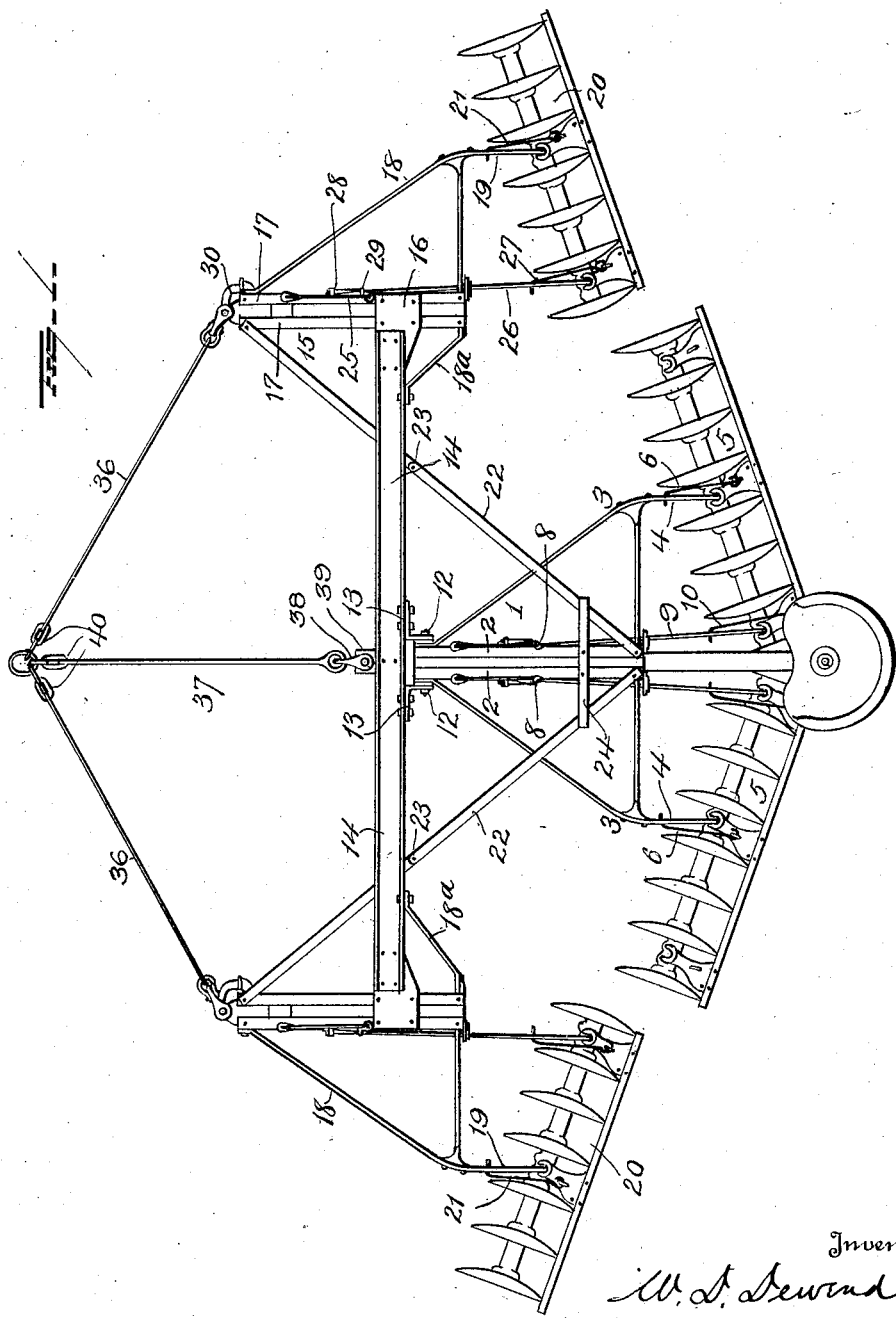

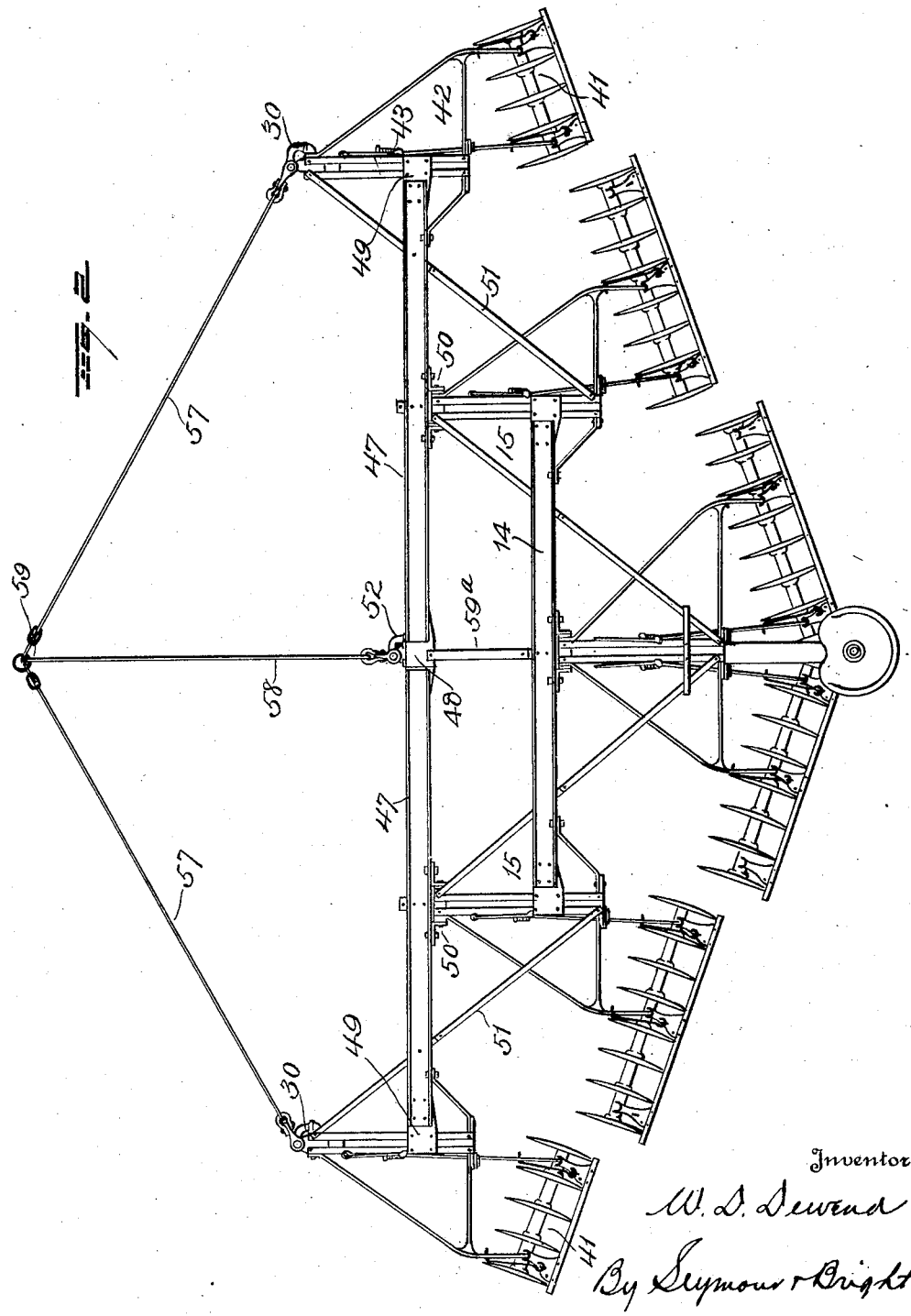

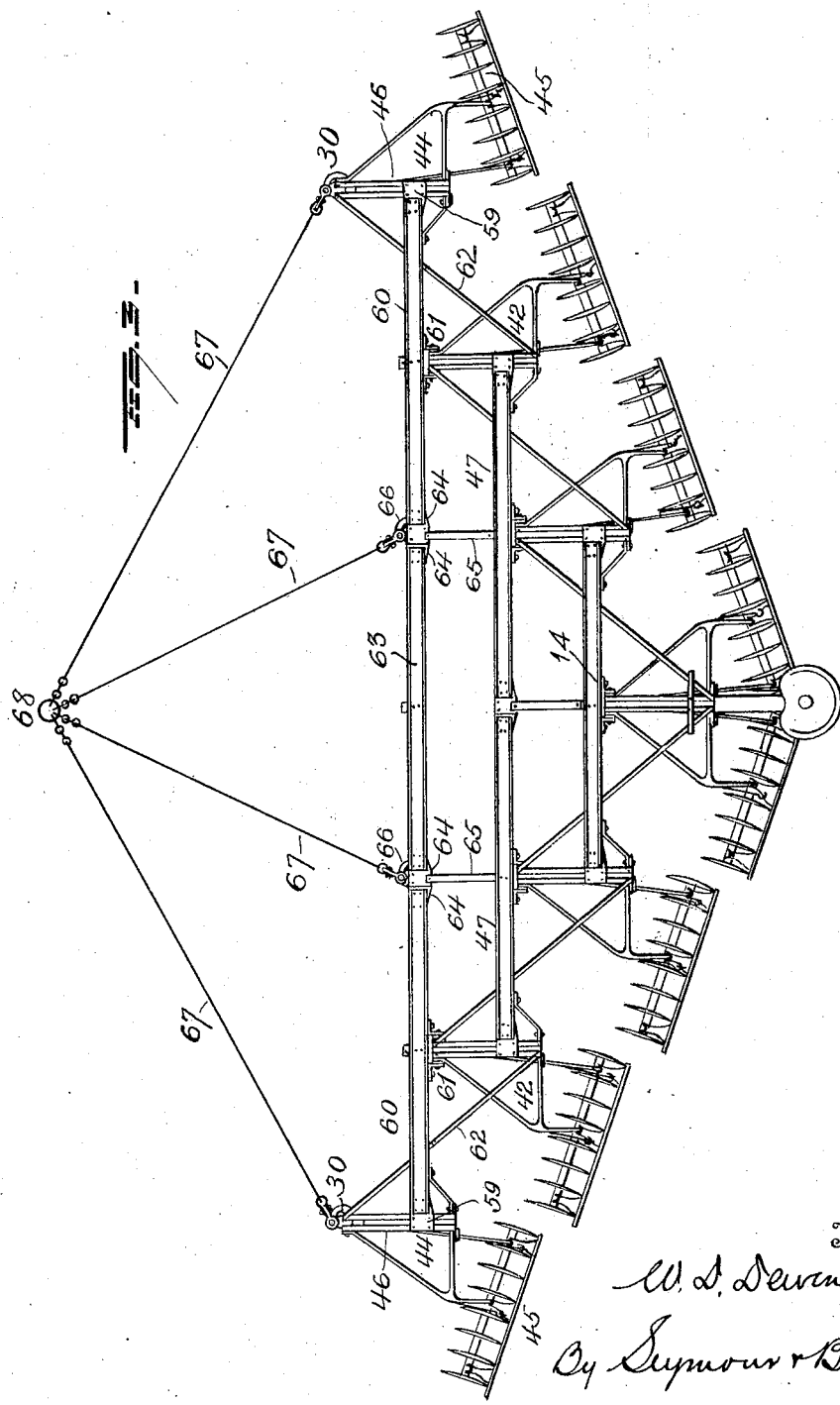

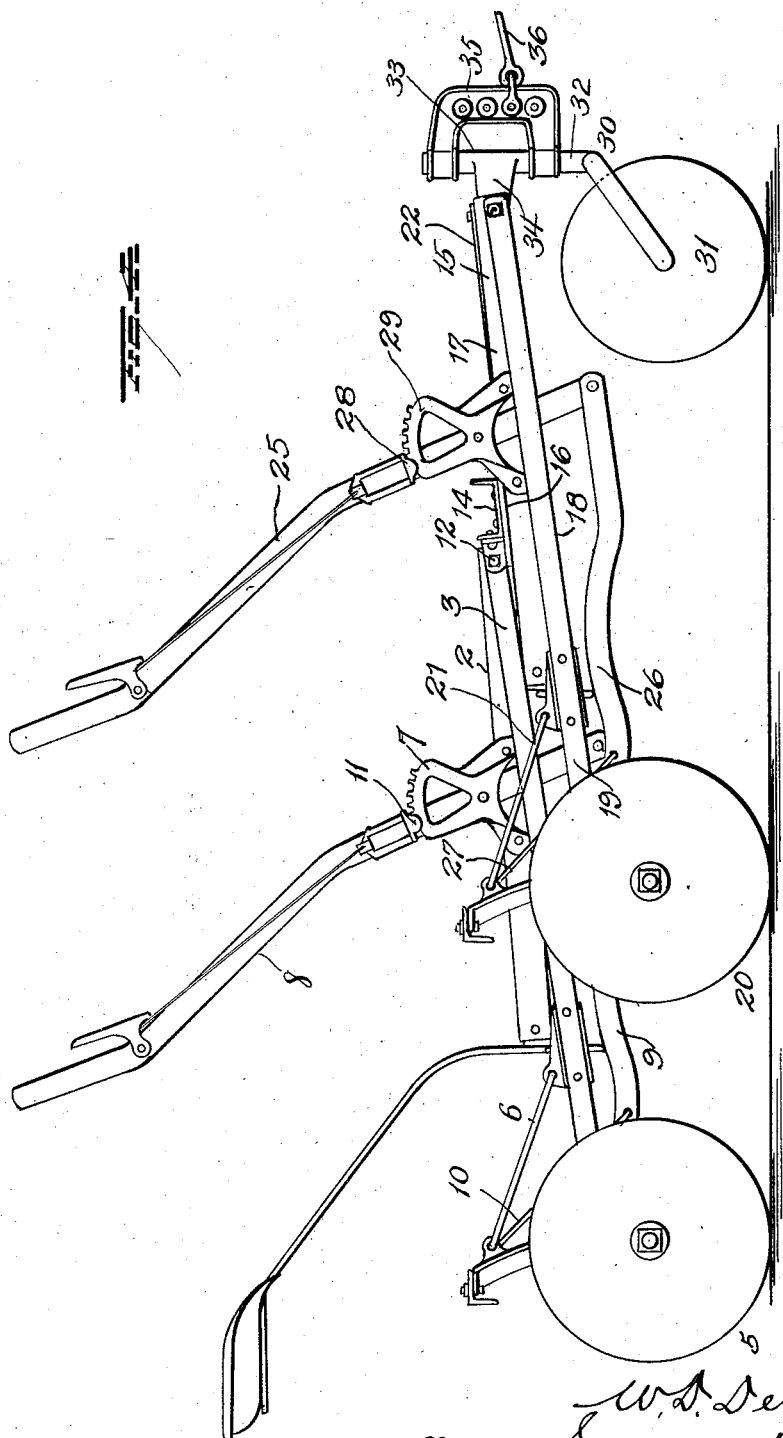

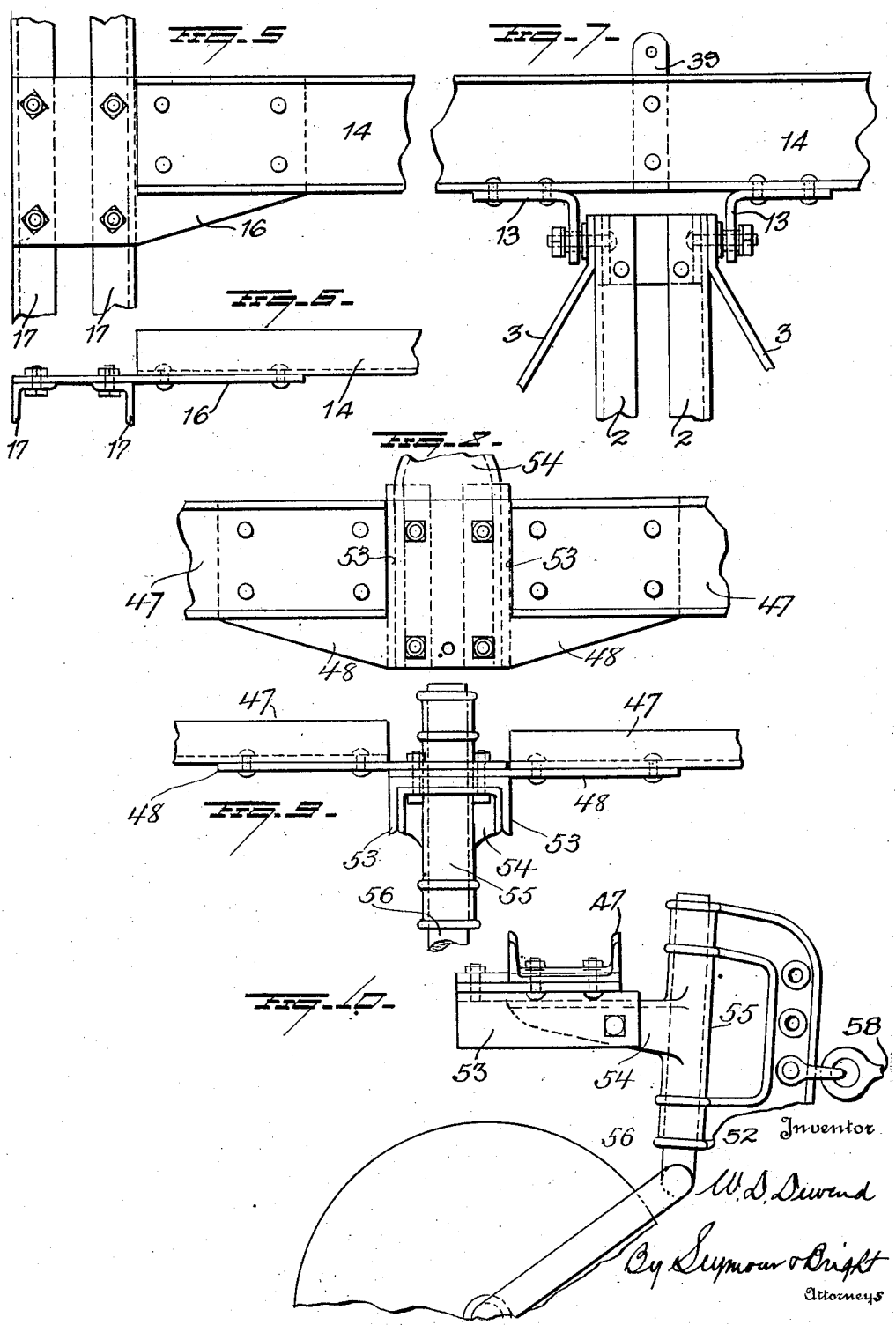

1,780,644

UNITED STATES PATENT OFFICE

WILLIAM D. DEWEND, OF SOUTH BEND, INDIANA, ASSIGNOR, BY MESNE ASSIGNMENTS, TO OLIVER FARM EQUIPMENT COMPANY, A CORPORATION OF DELAWARE

DISK HARROW

Application filed May 10, 1928. Serial No. 276,710.

This invention relates to improvements in disk harrows and has particular reference to the wide single cut outthrow type,—one object of the invention being to provide a disk harrow of the class specified, which may be converted from a harrow of one size or width to one of a different size or width, and to accomplish such change or adjustment with the use of a plurality of like sections or units.

A further object is to construct a multiple unit disk harrow of the type specified in such manner that adequate flexibility and vertical movement of the units shall be provided to insure the maintenance of the units in conformity with the irregularities of the ground, and so that the several units shall be kept properly spaced with respect to each other.

With these and other objects in view, the invention consists in certain novel features as hereinafter set forth and pointed out in the claims.

In the accompanying drawings;

Figure 1 is a plan view of a disk harrow illustrating certain features of my invention;

Figure 2 is a plan view showing a combination of similar units whereby to produce a harrow having a wider cut than the harrow shown in Fig. 1;

Figure 3 is a view of a harrow comprising a greater number of similar units and forming a harrow having a still wider cut;

Figure 4 is a view in side elevation of the harrow shown in Fig. 1, and

Figures 5, 6, 7, 8, 9 and 10 are fragmentary detail views.

In the embodiment of the invention shown in Fig. 1, a central frame 1 is shown,—said frame comprising two parallel, longitudinally disposed bars 2, 2, (preferably of angle-bar form) and frame members 3, 3 of triangular form projecting laterally from the respective frame bars 2, 2 and secured thereto at the front and rear ends thereof. The respective lateral frame members 3 are provided with rearwardly projecting arms 4 with which intermediate portions of disk gangs 5 are loosely connected,—the frames of said gangs being also connected with the frame members 3 through the medium of links 6. A toothed segment frame 7 is secured to each frame bar 2, and to each segment frame 7 a hand lever 8 is pivoted and these hand levers are connected, through the medium of links 9, 10, with inner end portions of the disk gangs. It is apparent that by manipulating the hand levers, the disk gangs may be angled and they may be held at any desired adjustment by cooperation of detents 11 on said levers with the toothed segments on the frames 7.

That portion of the structure above described may be considered as a center harrow unit of the well known bumper gang type, comprising a frame structure, a right and a left hand disk gang, and levers on the frame to angle the gangs.

The forward end of the frame 1 is pivotally connected as at 12, through the medium of brackets 13, with the central portion of a transversely disposed draw-bar or beam 14 which, in the embodiment shown in the drawing, may be of channel form. At respective ends of the draw-bar or beam 14, frame units 15 are connected by means of brackets 16.

The frame units 15 are the same in construction,—each comprising parallel bars 17, a lateral frame member 18, like the frame 3 a brace 18ª connecting the lower end of one of the parallel bars 17 with the draw-bar or beam 14, and a rearwardly projecting arm 19 like the arm 4.

To the rear end of the arm 19 of each frame member 18, a disk gang 20 is pivoted intermediate of its ends and the frames of the disk gangs 20 may be connected with the arms 19 by means of links 21, corresponding in all essential respects to the links 6. Diagonal braces 22, jointed at 23 in line with the pivotal connection 12 between central frame 1 and the draw-bar 14 maintain the proper spacing of the gangs,—said braces being secured to the draw-bar and to the frames 1 and 15, and a bar 24 secured to the central frame 1 may overlie rear portions of the diagonal braces. Angling levers 25 are mounted on the frames 15 and connected with the disk gang structures 20 through the medium of links 26, 27, and said levers are provided with detents 28 to cooperate with toothed segments 29,—all as hereinbefore described in connection with the central disk gangs 5.

The front end of each of the lateral frames 15 is supported by a forecarriage 30, comprising a wheel 31 and an axle 32, the latter having a vertical portion mounted in a bearing sleeve 33 connected with frame 15 through the medium of an arm 34. A clevis 35 is connected with each forecarriage axle 30 and with these clevises draft rods 36 are connected, and a central draft rod 37 is connected, through the medium of a clevis 38 and a bracket 39, with the central portion of the transverse draw-bar or beam 14,—the forward ends of the draft rods 36, 36 and 37 being connected together, preferably through the medium of links as indicated at 40.

In the embodiment of the invention shown in Fig. 2 in which the harrow is adapted for a wider cut, there are additional lateral disk gangs 41, each carried by a frame unit 42 provided with angling means 43, and in Fig. 3 additional frame units 44, disk gang units 45 and angling means 46 are shown so as to provide a harrow adapted to make a wider cut than those shown in Figs. 1 and 2. It will be obvious from an inspection of the drawings that the additional frame units or sections 42 and 44 are, in all essential respects, like the frame units or sections 15.

In the arrangement shown in Fig. 2, additional transverse draw-bars or beams 47 are provided, each being the same in construction and having the same proportions as the draw-bar or beam 14. The inner ends of the draw-bars or beams 47 are connected by splice plates 48 riveted to the respective beams 47 and having their inner end portions overlapping and secured together as shown in Figs. 8 and 9. The lateral frame units 42 which carry the disk gangs 41 are connected with the outer ends of the respective transverse draw bar units 47 through the medium of brackets 49. It will be observed that the forecarriages 30 have been removed from frames 15 and placed at the forward ends of the frame units 42, and that central portions of the transverse draw-bars or beams 47 are pivotally connected, as at 50, with the forward ends of the frames 15. It will also be observed that jointed diagonal braces 51 connect the rear ends of the frames 15 with the forward ends of the frames 42 and with the draw-bar units 47, the same as the jointed braces 22 connect rear portions of the central frame members with the forward portions of the frame members 15.

A forecarriage 52 is located adjacent to the inner ends of the transverse draw-bars 47. Angle irons 53 are secured to the splice plates 48 and receive between them, the arm or shank 54 of a housing sleeve 55, said arm or shank being secured to the angle irons and splice plates. The axle 56 of the central forecarriage 52 has its mounting in the bearing sleeve 55, as will be readily understood. The forecarriages 30 of the frame units 42 and the central forecarriage 52 have draft rods 57, 57, 58 connected therewith and the forward ends of said rods are connected together, preferably through the medium of links as shown at 59. A draft link 59ª connects the splice plates 48 with the central portion of the draw-bar unit 14.

In the embodiment of the invention shown in Fig. 3, the added lateral frame units 44 carrying the added lateral disk gangs 45, are secured by brackets 59 with the outer ends of transverse draw-bar or beam units 60, the central portions of the latter having pivotal connection, as at 61, with the forward ends of the frame units 42, and the forecarriages 30 are moved from said frame units 42 to forward ends of the frame units 44. Diagonal jointed braces 62 extend from the rear ends of the frame units 42 to the forward ends of the frame units 44 and are secured to draw-bar units 60.

In the embodiment of the invention shown in Fig. 3, an intermediate draw-bar unit 63 is interposed between the draw-bar units 60, 60 and secured to the same through the medium of splice plates 64, the same as previously described in connection with the draw-bar units 47, 47 of the Fig. 2 arrangement, and as illustrated in Figs. 8 and 9. The splice plates 64 between the central draw bar 63 and the draw bars 60 are connected with intermediate portions of the draw-bar units 47 through the medium of draft links 65. In the arrangement shown in Fig. 3, forecarriages 66, 66 are located between the central draw-bar unit 63 and the draw-bar units 60, 60 and are connected with the splice plates 64 in the same manner as previously described and shown in Figs. 8, 9 and 10. Draft rods 67 are connected with the clevises of the several forecarriages 30, 30 and 66, 66 and the forward ends of said draft rods are connected, preferably through the medium of links as shown at 68.

It will be observed that with my improvements, the size and width of cut by the harrow may be changed by the addition or removal of like sections or units,—each of said sections or units comprising a frame unit, a disk gang unit and a transversely disposed draw-bar unit with which the frame unit is connected. It will also be observed that the outer frame units are supported on forecarriages and that when two or more draw-bar units are employed in longitudinal alignment, forecarriages are employed for supporting the same.

Having fully described my invention what I claim as new and desire to secure by Letters Patent, is:—

1. In a harrow, the combination with a central frame and disk gangs connected therewith, of a transverse draw-bar, means pivotally connecting the forward end of the central frame with said draw-bar, like lateral frames having rigid connection with respective ends of said draw-bar, a lateral disk gang connected with each lateral frame, and draft rods connected with the lateral frames and the central portion of the transverse draw-bar.

2. In a harrow, the combination with a central frame, and disk gangs connected therewith, of a transverse draw-bar, means for effecting pivotal connection of the central frame with the central portion of said draw-bar, lateral frames having rigid connection with respective ends of said draw bar, lateral disk gangs connected with said lateral frames, and jointed braces connecting rear portions of the central frame with forward portions of the lateral frames and attached to the transverse draw-bar.

3. In a harrow, the combination with a central frame, and disk gangs connected therewith, of a transverse draw-bar, means effecting connection between the forward end of the central frame and said transverse draw bar, lateral frames having rigid connection with respective ends of said transverse draw-bar, lateral disk gangs connected with said lateral frames, and forecarriages for supporting forward portions of said lateral frames.

4. A harrow comprising a plurality of longitudinally spaced transverse draw-bars, connections between the draw-bars, disk gangs connected centrally with rearmost draw-bar, and disk gangs connected to the ends of the several draw-bars.

5. A harrow comprising a plurality of transversely disposed draw-bars, lateral frames each having rigid connection with an end portion of a draw bar, disk gangs each connected with a frame, and means for supporting the front of the harrow.

6. A harrow comprising a plurality of longitudinally spaced transverse draw-bars, lateral frames each having rigid connection with a transverse draw-bar, disk gangs each connected with a lateral frame, and forecarriages supporting the lateral frames and the front draw-bar.

7. A harrow comprising a plurality of longitudinally spaced transversely disposed draw-bars, lateral frames each having rigid connection with an end portion of a draw bar, disk gangs each connected with a frame, means for supporting the foremost frames and draw-bars, and draft rods each connected with a lateral frame and a draw-bar.

8. A harrow comprising a plurality of longitudinally spaced transverse draw-bars, lateral frames each having rigid connection with a transverse draw-bar, disk gangs each connected with a lateral frame, forecarriages supporting the lateral frames and foremost draw-bar, and draft rods connected with the several forecarriages.

9. A harrow comprising a plurality of members removably connected together whereby the width of the harrow as a whole may be varied, each of said members comprising a transverse draw-bar, a lateral frame rigidly secured to the end of the draw-bar and an angularly adjustable disk gang carried by the lateral frame.

10. A harrow comprising a plurality of longitudinally spaced transversely disposed draw-bars, lateral frames each rigidly connected with a draw-bar, and lateral angularly adjustable disk gangs each connected with a lateral frame, some of said draw-bars comprising sections arranged in longitudinal alignment, splice plates connecting the aligning sections, forecarriages connected with said splice plates, forecarriages connected with the lateral frames farthest removed from the longitudinal center of the harrow, and draft rods connected with said forecarriages.

11. A harrow comprising a plurality of longitudinally spaced, transversely disposed draw-bars, lateral frames each secured with the end portion of a draw-bar, each draw-bar being pivotally connected with a preceding draw-bar, disk gangs each connected with a lateral frame, and means for supporting the front draw-bar and frames.

12. A harrow comprising a plurality of longitudinally spaced, transversely disposed draw-bars, the length of the draw-bars increasing uniformly from rear to front and each draw-bar being pivotally connected with the next forward draw-bar, disk gangs each connected with a frame, and means for supporting the foremost frames and draw-bar.

13. A harrow comprising a plurality of longitudinally spaced, transversely disposed draw-bars disposed in parallelism, each draw-bar being pivotally connected with its adjacent preceding unit, disk gangs each connected with a frame, and means for supporting the foremost frames and draw-bar.

In testimony whereof, I have signed this specification.

WILLIAM D. DEWEND.